United States Patent
Kobayashi

(10) Patent No.: US 10,110,359 B2
(45) Date of Patent: Oct. 23, 2018

(54) WIRELESS COMMUNICATION SYSTEM AND WIRELESS BASE STATION

(71) Applicant: FUJITSU LIMITED, Kawasaki-shi, Kanagawa (JP)

(72) Inventor: Noboru Kobayashi, Tokorozawa (JP)

(73) Assignee: Fujitsu Limited, Kawasaki (JP)

( * ) Notice: Subject to any disclaimer, the term of this patent is extended or adjusted under 35 U.S.C. 154(b) by 50 days.

(21) Appl. No.: 14/969,408

(22) Filed: Dec. 15, 2015

(65) Prior Publication Data
US 2016/0182281 A1 Jun. 23, 2016

(30) Foreign Application Priority Data
Dec. 17, 2014 (JP) .................................. 2014-254834

(51) Int. Cl.
| | |
|---|---|
| H04L 12/58 | (2006.01) |
| H04L 5/00 | (2006.01) |
| H04W 40/04 | (2009.01) |
| H04L 12/803 | (2013.01) |
| H04W 92/20 | (2009.01) |
| H04W 88/08 | (2009.01) |

(52) U.S. Cl.
CPC .......... *H04L 5/0053* (2013.01); *H04L 47/122* (2013.01); *H04W 40/04* (2013.01); *H04W 88/085* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 2006/0227726 A1 | 10/2006 | Zuniga et al. | |
| 2010/0234035 A1 | 9/2010 | Fujishima et al. | |
| 2012/0224541 A1 | 9/2012 | Yoshiuchi et al. | |
| 2013/0279452 A1 | 10/2013 | Liu | |
| 2014/0029431 A1 | 1/2014 | Haberland et al. | |
| 2016/0094318 A1* | 3/2016 | Shattil | H04B 7/026 375/267 |
| 2016/0165626 A1* | 6/2016 | Finne | H04W 72/1278 370/336 |

FOREIGN PATENT DOCUMENTS

| | | |
|---|---|---|
| JP | 2007-228213 A | 9/2007 |
| JP | 2008-536454 A | 9/2008 |
| JP | 2010-213007 A | 9/2010 |

(Continued)

OTHER PUBLICATIONS

Japanese Office Action of corresponding Japanese Patent Application No. 2014-254834 dated Aug. 7, 2018.

(Continued)

*Primary Examiner* — Zewdu A Beyen
(74) *Attorney, Agent, or Firm* — Arent Fox LLP

(57) ABSTRACT

A wireless communication system including: a wireless terminal, and a wireless base station configured to: perform a wireless communication with the wireless terminal, and perform at least a specified processing included in a baseband processing for the wireless communication, the baseband processing being shared between the wireless base station and a different wireless base station, the specified processing being a processing that has a limitation of processing time.

12 Claims, 10 Drawing Sheets

(56) References Cited

FOREIGN PATENT DOCUMENTS

| | | |
|---|---|---|
| JP | 2011-87251 A | 4/2011 |
| JP | 2012-182792 A | 9/2012 |
| JP | 2014-514848 A | 6/2014 |
| WO | WO 2013/072108 A1 | 5/2013 |
| WO | WO 2013/174544 A1 | 11/2013 |

OTHER PUBLICATIONS

Japanese Office Action of corresponding Japanese Patent Application No. 2014-254834 dated Jul. 31, 2018.

* cited by examiner

WIRELESS COMMUNICATION SYSTEM AND WIRELESS BASE STATION

CROSS-REFERENCE TO RELATED APPLICATION

This application is based upon and claims the benefit of priority of the prior Japanese Patent Application No. 2014-254834, filed on Dec. 17, 2014, the entire contents of which are incorporated herein by reference.

FIELD

The embodiments discussed herein are related to a wireless communication system, a wireless base station, a baseband unit, a control device, and a wireless communication method.

BACKGROUND

Cellular wireless communication systems based on wireless communication protocols, such as wideband code division multiple access (W-CDMA), long term evolution (LTE), and the like, have been widely used. A cellular wireless communication system includes many wireless base stations forming many cells. Therefore, in recent years, a large number of wireless base stations have been disposed all around.

If a sufficient number of wireless base stations are not disposed, cells are not formed in a wide range, and a problem arises in which a cellular service area (a cover area) may be limited. As a matter of course, it imposes large cost to dispose a wireless base station. Therefore, techniques for efficiently forming a cell have been great concerns of service providers (wireless communication carriers) in recent years.

Incidentally, in general, a wireless base station includes a baseband unit (BBU) and a radio frequency unit (an RF unit). The BBU performs baseband processing that is processing performed on a baseband signal. In contrast, the RF unit mutually converts a baseband signal and an RF signal from one to another and performs transmission and reception of an RF signal via an antenna. In this case, a baseband signal is a low frequency digital signal. Since there is a limit in performing complex processing on an RF signal that is a radio frequency analog signal, at reception of an RF signal, a wireless base station demodulates the RF signal received via the antenna to a baseband, and then, performs various types of processing thereon. At transmission of an RF signal, the wireless base station performs various types of processing on a baseband signal related to information that is desired to be transmitted, modulates the baseband signal to an RF signal, and then, transmits the RF signal via the antenna.

As described above, in general, a cellular wireless base station forms a cell. In a known cellular wireless communication system, a single wireless base station forms a single cell. Specifically, a known wireless base station has a configuration in which a single BBU and a single RF unit are integrated as one unit and thus is enabled to form a single cell.

In contrast, a configuration in which a single wireless base station forms a plurality of cells was recently introduced. Such a wireless base station includes a single BBU and a plurality of RF units. The BBU and the RF units are physically separated from one another, and are coupled to one another via an optical fiber or the like. Thus, a single wireless base station is allowed to form a plurality of cells (cells of a number corresponding to the number of RF units).

Thus, a configuration in which a BBU is not provided for each cell is allowed, and therefore, a computer resource per cell that is to be prepared in a BBU may be reduced (due to a statistical multiplexing effect). Furthermore, an increase in efficiency of a computer resource in an entire system is allowed.

Note that there are cases where such a configuration as one described above, in which a plurality of RF units is controlled by a single BBU, is called centralized radio access network (C-RAN). Also, there are cases where a BBU in a wireless base station having a C-RAN configuration is specifically called centralized baseband unit (CBBU). Furthermore, there are cases where a device in a wireless base station having a C-RAN configuration, which corresponds to an RF unit, is called a remote radio unit (RRU) or a remote radio head (RRH).

Japanese Laid-open Patent Publication No. 2010-213007, Japanese Laid-open Patent Publication No. 2012-182792, Japanese National Publication of International Patent Application No. 2014-514848, and Japanese Laid-open Patent Publication No. 2007-228213 discuss related art.

SUMMARY

According to an aspect of the invention, a wireless communication system including: a wireless terminal, and a wireless base station configured to: perform a wireless communication with the wireless terminal, and perform at least a specified processing included in a baseband processing for the wireless communication, the baseband processing being shared between the wireless base station and a different wireless base station, the specified processing being a processing that has a limitation of processing time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
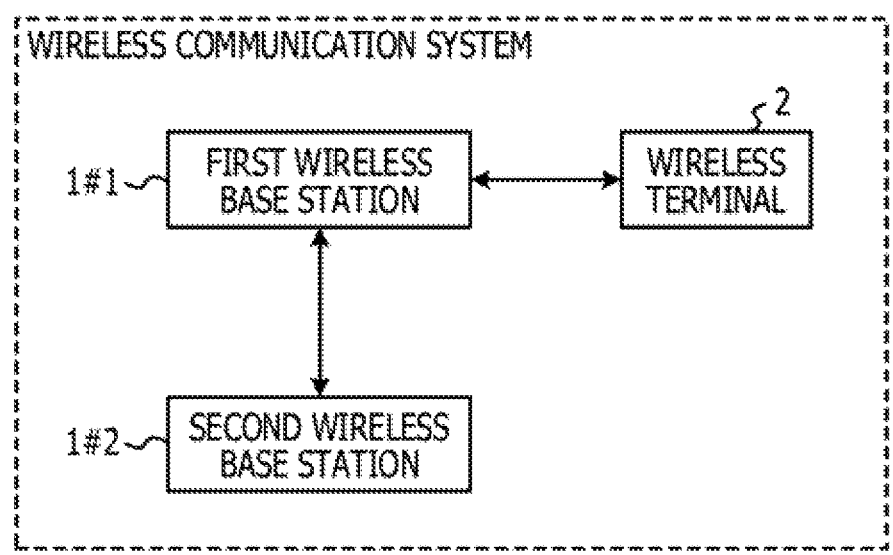
FIG. 1 is a diagram illustrating a first embodiment.

Baseband processing performed by a BBU includes a large number of individual processes and, among the processes, there is a process which has a time limitation (a time restraint) defined by a specification of a wireless communication protocol. For example, in the specification (standard specification) of LTE, it is defined that, in a function called hybrid automatic repeat request (HARQ), when a wireless base station receives uplink data from a wireless terminal, the wireless base station sends an ACK signal or a NACK signal as a response in a subframe four subframes after a subframe of the uplink data (in the case of FDD). Such a time limitation in the specification is desired to be strictly satisfied, and therefore, it is desired that the BBU performs baseband processing such that the time limitation is satisfied. Specifically, the BBU finishes demodulation and decoding of the received uplink data, determines whether or not reception was successfully performed, and prepares for sending the ACK signal or the NACK signal as a response in a little over three subframes (corresponding to a little over three milliseconds).

However, the load of the BBU is increased by managing a plurality of cells, and thus, reduction in performance is caused in the BBU. As a result, there might be cases where the BBU does not satisfy the time limitation defined by the specification.

Furthermore, in a C-RAN configuration, a propagation delay between a BBU (CBBU) and an RRU occurs for constructive reasons. Therefore, a more strict time limitation is imposed on the BBU.

This problem may be solved to a certain extent by introducing a high-speed hardware to a BBU, but there are cases where introduction of a high-speed hardware is difficult because such a hardware is very expensive.

In view of the foregoing, a technique disclosed herein has been devised, and it is therefore an object of the present disclosure to provide a wireless communication system, a wireless base station, a baseband unit, a control device, and a wireless communication method which enable compliance with a time limitation defined by the specification, even when an overload or the like occurs in a BBU that manages a plurality of cells.

Embodiments of disclosed wireless communication system, wireless base station, baseband unit, control device, and wireless communication method will be described below with reference to the accompanying drawings. Note that, for the sake of convenience, each of the embodiments will be separately described, but it is needless to say that the embodiments may be combined to achieve advantages of the combination and furthermore to increase utility.

Note that, in the present disclosure, for example, when a member is denoted by a wireless base station 1, there are a case where the wireless base station 1 indicates an individual wireless base station and a case where the wireless base station 1 indicates an assembly of wireless base stations, and it is desired to determine, as appropriate, which the former case or the latter case applies to the description, depending on context.

First Embodiment

A first embodiment will be described with reference to FIG. 1. As illustrated in FIG. 1, a wireless communication system according to the first embodiment includes a first wireless base station 1#1 configured to perform wireless communication with a wireless terminal 2 and one or more other wireless base stations 1, and, in performing the wireless communication, baseband processing performed for the wireless communication is shared between the first wireless base station 1#1 and a second wireless base station 1#2, which is one of the one or more other wireless base stations 1, and the first wireless base station 1#1 performs at least a specific process, in the baseband processing, which has a processing time limitation.

A technical significance of the first embodiment will be described. As described above, the present disclosure focuses on a problem in which, when the load of baseband processing of the wireless base station 1 is high, or in like case, a time limitation for baseband processing based on a specification of a wireless communication protocol is not satisfied.

Thus, a case where the load of baseband processing of one of the wireless base stations 1 (which will be referred to as a first wireless base station 1#1 for the sake of convenience) is high will be considered. In this case, in the wireless communication system according to the first embodiment, baseband processing of the wireless base station 1 is shared with one of the one or more other wireless base stations 1 (which will be referred to as the second wireless base station 1#2 for the sake of convenience). That is, a part of the baseband processing of the one of the wireless base stations 1 is taken over by the one of the one or more other wireless base stations 1. Thus, the load of the baseband processing of the one of the wireless base stations 1 is dispersed, and the load of the one of the wireless base stations 1 is reduced.

However, only with the foregoing consideration, there is still a probability that the above-described problem is not solved. When baseband processing is shared among the plurality of wireless base stations 1, a baseband signal is passed among the plurality of wireless base stations 1. Passing a baseband signal naturally causes a propagation delay and, in general, a distance between BBUs is longer than a distance between a BBU and an RRU. Therefore, a propagation delay caused by passing a baseband signal is relatively large.

Therefore, when baseband processing is randomly shared, although the load of the wireless base station 1, which is a share source, is reduced, a relatively large propagation delay is added, so that an entire processing time of the baseband processing might be increased. In such a case, the above-described problem of a time limitation for baseband processing based on the specification of a wireless communication protocol is not solved.

Thus, in a wireless communication system according to the first embodiment, when baseband processing of one of the wireless base stations 1 is shared with one of the one or more other wireless base stations 1, a process, in the baseband processing, which has a time limitation, is performed by the one of the wireless base stations 1 (by itself). A process, in the baseband processing, which does not have a time limitation, is taken over by one of the one or more other wireless base stations 1. In this case, processing is divided depending on the existence or non-existence of a time limitation, but note that the existence or non-existence of a time limitation may be interpreted as whether or not there is a time limitation, and also, may be interpreted as whether relatively large or small (or whether relatively strict or loose) a time limitation is.

Note that, in the background of the present disclosure and the problems to be solved by the present disclosure, which have been described above, discussions were made based on a wireless communication system including a wireless base station 1 having a so-called C-RAN configuration in which a BBU and an RRU are physically separated. However, note that the present disclosure is not limited to such a wireless communication system, but may be applied to a wireless communication system including a wireless base station 1 of a known (integrated) type and a wireless base station 1 having a C-RAN configuration together and a wireless communication system including a wireless base station 1 of a known type only. To be brief, the problem to be solved by the present disclosure is merely remarkable in a wireless base station 1 having a C-RAN configuration, and a wireless base station 1 having a C-RAN configuration is not the premise of the present disclosure.

To summarize the foregoing, in the first embodiment, even when baseband processing of the wireless base station 1#1 is shared with the second wireless base station 1#2, which is one of the one or more other wireless base stations 1, the first wireless base station 1#1 performs (by itself) at least a process, in the baseband processing, which has a time limitation. Thus, the process, in the baseband processing, which has a time limitation, is not influenced by a delay caused by passing of a baseband signal. Therefore, according to the first embodiment, the above-described problem of a time limitation for baseband processing based on the specification of a wireless communication protocol may be solved.

Second Embodiment

A second embodiment will be described below with reference to FIG. 2 to FIG. 4. The second embodiment corresponds to a case where the present disclosure is applied to a wireless communication system based on LTE. However, note that application of the present disclosure is not limited to LTE and the present disclosure is applicable to a wireless communication system based on another wireless communication protocol in a similar manner.

In the second embodiment, similar to the first embodiment, when baseband processing of one of the wireless base stations 1 is shared with one of the one or more other wireless base stations 1, the one of the wireless base stations 1 performs (by itself) a process, in the baseband processing, which has a time limitation. A process, in the baseband processing, which does not have a time limitation, may be taken over by the one of the one or more other wireless base stations 1.

In the present disclosure, a key point is that how "a process which has a time limitation" and "a process which does not have a time limitation" in baseband processing are divided. In the second embodiment, the division between these processes is performed based on a protocol stack of LTE. This point will be described first below.

Figure 2A:
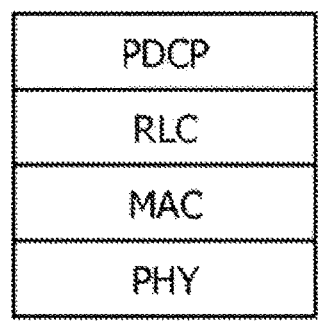
FIG. 2A and FIG. 2B are diagrams illustrating protocol stacks of LTE.
Figure 2B:
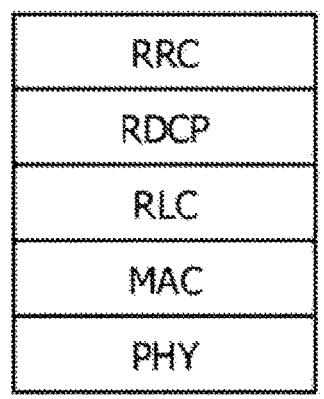

First, the protocol stack of LTE will be described with reference to FIG. 2A and FIG. 2B. FIG. 2A is a diagram illustrating a protocol stack of a user plane that is a protocol used for transferring user data in LTE. FIG. 2B is a diagram illustrating a protocol stack of a control plane that is a protocol used for transferring a control signal in LTE. These protocol stacks are defined by the standard specification of LTE. Therefore, every baseband processing in an LTE system is performed in accordance with these protocol stacks.

The protocol stack of a user plane of LTE illustrated in FIG. 2A includes a physical layer, a medium access control sublayer (a MAC layer), a radio link control sublayer (a RLC layer), and a packet data convergence protocol sublayer (a PDCP layer) stacked from the bottom. The physical layer is a hierarchical layer corresponding to a first layer (Layer 1) in an open system interconnection (OSI) reference model, and handles many processes in order to realize information transmission with a wireless signal that is a physical medium. The MAC layer, the RLC layer, and the PDCP layer, on the other hand, are layers corresponding to a second layer (Layer 2) in the OSI reference model. The MAC layer handles multiple separation of a transmission and reception signal, and the like, the RLC layer handles retransmission control, and the like, and the PDCP layer handles a security function, and the like.

The protocol stack of a control plane of LTE illustrated in FIG. 2B includes a radio access control sublayer (an RRC layer) above the physical layer, the MAC layer, the RLC layer, and the PDCP layer, which have been described above. The RRC layer is a layer corresponding to a third layer (Layer 3) in the OSI reference model and handles many processes related to control of a wireless link.

Thus, a wireless communication protocol of LTE has a hierarchical protocol stack. Therefore, baseband processing performed by a BBU 11 corresponds to the protocol stack and hierarchical processing is performed.

Incidentally, like demodulation and decoding processing and the like in accordance with the HARQ, which has been described above, there is a process for which a strict time limitation is defined in the (standard) specification of LTE. Needless to say, such an individual time limitation is eventually defined by a specification. However, in view of the above-described protocol stacks, tendencies of such time limitations may be found to a certain extent.

Specifically, there is a tendency that the lower a hierarchical layer in a protocol stack is, the more strict a time limitation is relatively. In contrast, there is a tendency that the higher a hierarchical layer in a protocol stack is, the looser a time imitation is relatively. As a specific example, for a process, such as demodulation and decoding and the like, in accordance with the above-described HARQ, a strict time limitation is defined in the specification, and the processing is executed in the physical layer, which is the lowest layer, (HARQ control is performed by the MAC layer).

As described above, an individual time limitation is eventually defined by the specification but, in general, depending on the level of a hierarchical layer in a protocol stack, the strictness of a time limitation on a process performed by the hierarchical layer differs. This difference occurs because a process of a hierarchical layer is premised on a process of a lower hierarchical layer, and is considered to be fateful in a wireless communication protocol having a hierarchical protocol stack.

In the view of the foregoing, in the second embodiment, hierarchical layers forming a protocol stack of LTE are divided into two, among the hierarchical layers, a relatively low hierarchical layer is handled as a hierarchical layer which performs "a process that has a time limitation", and a relatively high hierarchical layer is handled as a hierarchical layer which performs "a process that does not have a time limitation". More specifically, as an example, the physical layer is handled as a hierarchical layer that performs "a process that has a time limitation", and the MAC layer and higher layers are handled as hierarchical layers each of which performs "a process that does not have a time restriction". Thus, for example, a process, such as demodulation and decoding, and the like, in accordance with the HARQ, which has been described above, is categorized as "a process that has a time limitation".

In the second embodiment, based on the above-described division, baseband processing is shared among the wireless base stations 1. That is, when the baseband processing of one of the wireless base stations 1 is shared with one of the one or more other wireless base stations 1, a process of the physical layer (which corresponds to the relatively low hierarchical layer) in the baseband processing is performed by the one of the wireless base stations 1 (by itself). Processes of the MAC layer and higher layers (each of which corresponds to the relatively high hierarchical layer) in the baseband processing may be taken over by the one of the one or more other wireless base stations 1. This is a key point of the second embodiment.

Next, a system configuration of a wireless communication system according to the second embodiment will be described with reference to FIG. 3. As a premise, the wireless communication system according to the second embodiment includes a plurality of wireless base stations 1. In FIG. 3, as an example, the wireless communication system includes three wireless base stations 1. Each of the wireless base stations 1 includes one BBU 11 and, for example, three RRUs 12. Thus, each of the wireless base stations 1 illustrated in FIG. 3 forms and controls three cells 1C.

Figure 3:
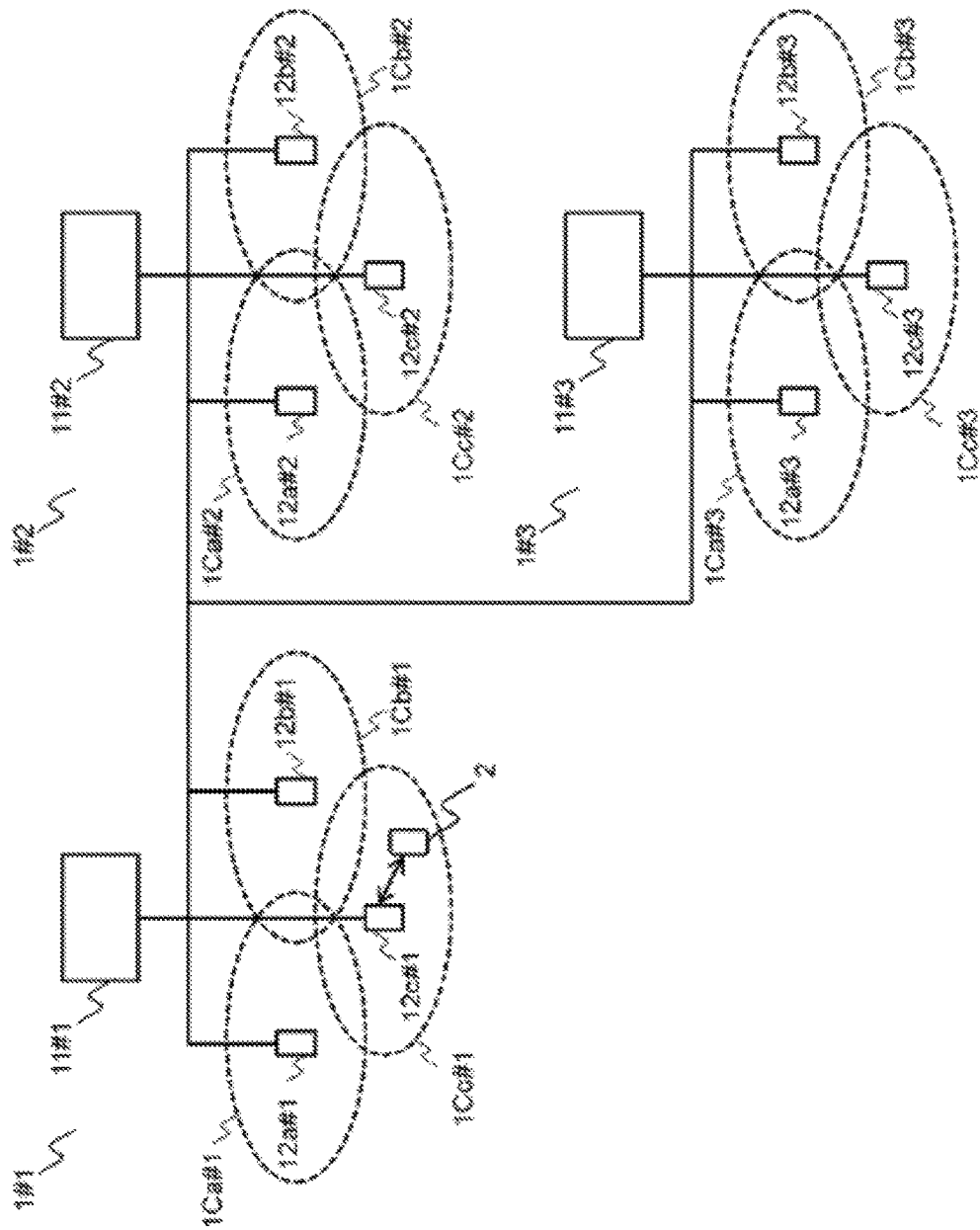
FIG. 3 is a diagram illustrating a system configuration according to a second embodiment.

In FIG. 3, the BBUs 11 are coupled to one another by an optical fiber or the like via an optical switch (not illustrated) or the like, and may perform low-delay communication. Also, each of the BBUs 11 and the corresponding one of the RRUs 12 are coupled to each other by an optical fiber or the like via an optical switch (not illustrated) or the like, and may perform low-delay communication. However, note that the configuration illustrated in FIG. 3 is an example and the present disclosure may be implemented without being limited to the configuration without departing from the gist of the present disclosure.

As illustrated also in FIG. 3, for the sake of convenience, the three wireless base stations 1 are referred to as a first wireless base station 1#1, a second wireless base station 1#2, and a third wireless base station 1#3. The respective BBUs 11 of the first to third wireless base stations 1#1, 1#2, and 1#3 are referred to as a first BBU 11#1, a second BBU 11#2, and a third BBU 11#3. Furthermore, for example, the three RRUs 12 of the first wireless base station 1#1 are referred to as a first RRU 12a#1 of the first wireless base station 1#1, an RRU 12b#1 of the first wireless base station 1#1, and an RRU 12c#1 of the first wireless base station 1#1, and the cells 1C formed by them are referred to as a first cell 1Ca#1 of the first wireless base station 1#1, a second cell 1Cb#1 of the first wireless base station 1#1, and a third cell 1Cc#1 of the first wireless base station 1#1. The RRUs 12 of the second wireless base station 1#2 and the third wireless base station 1#3, and the cells 1Cs formed by them are similarly referred.

Figure 4:
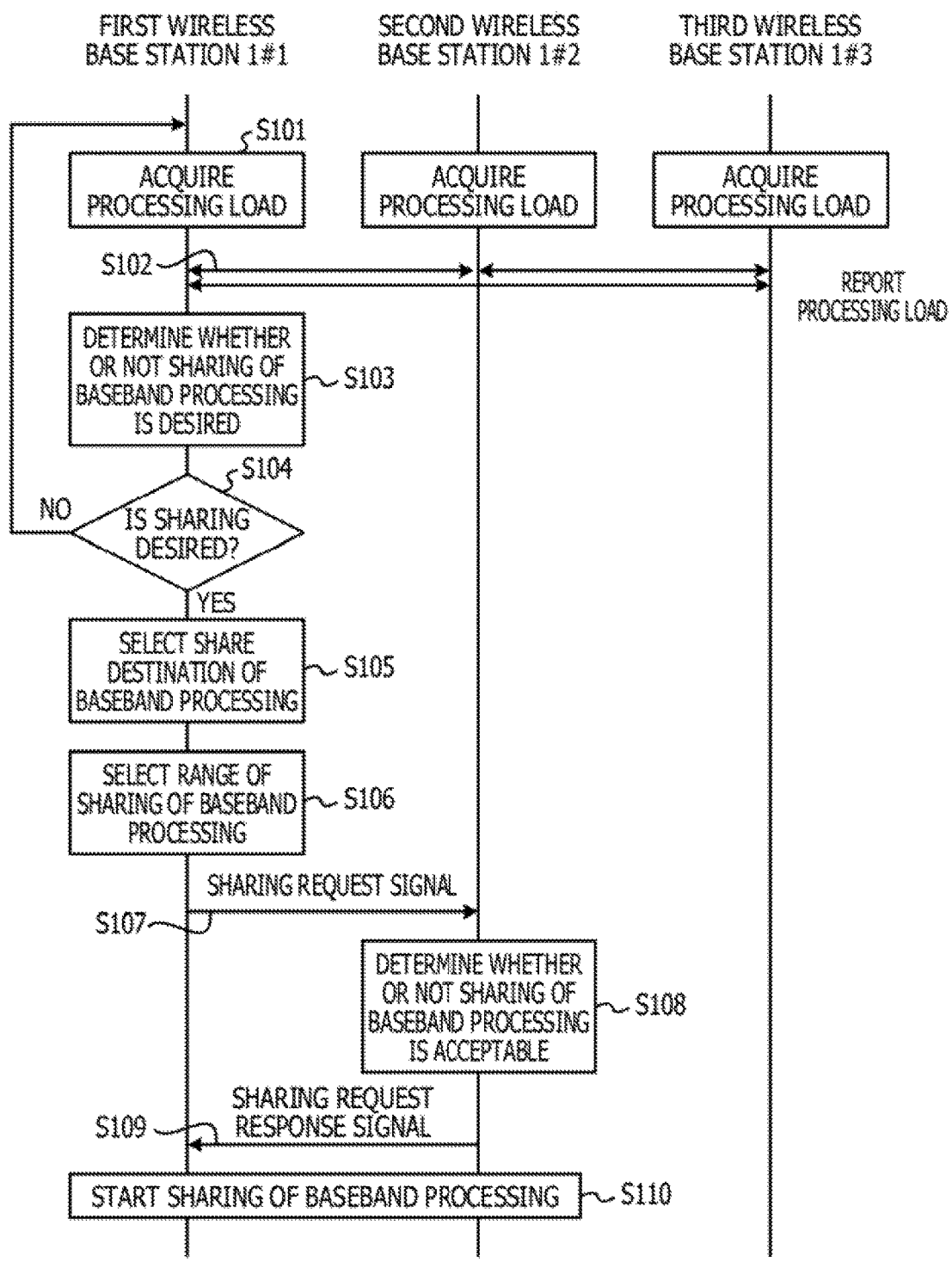
FIG. 4 is a sequence diagram illustrating a flow of processing according to the second embodiment.

Next, a sequence diagram illustrating a flow of processing performed in a wireless communication system according to the second embodiment with reference to FIG. 4.

FIG. 4 illustrates a flow of processing performed when each of processing loads of the wireless base stations 1 is used as an index that is considered in determining whether or not sharing of baseband processing is desired and selecting one of the wireless base stations 1, which is a share destination of baseband processing. However, note that the processing loads of the wireless base stations 1 are merely an example of the index, and another element may be considered. This point will be occasionally described in detail.

FIG. 4 illustrates, as an example, a processing sequence when the first wireless base station 1#1 shares baseband processing with the second wireless base station 1#2 and the third wireless base station 1#3, which correspond to the one or more other wireless base stations 1. In other words, FIG. 4 illustrates a processing sequence when the first wireless base station 1#1 is a share source of baseband processing and the one or more other wireless base stations 1 are share destinations of the baseband processing. However, for each of cases where the second wireless base station 1#2 is a share source of baseband processing and where the third wireless base station 1#3 is a share source of baseband processing, although the description thereof will be omitted herein, it is needless to say that similar processing may be performed. For example, when the second wireless base station 1#2 is a share source of baseband processing, baseband destinations are the first wireless base station 1#1 and the third wireless base station 1#3.

Processing of FIG. 4 will be sequentially described. First, in S101, each of the wireless base stations 1 (the first wireless base station 1#1 to the third wireless base station 1#3) acquires information (an index) related to the processing load of the wireless base station 1 itself. Acquisition of information related to the processing load may be regularly performed and may be performed in response to a predetermined trigger.

As information related to the processing load acquired in S101, arbitrary information may be used. For example, each of the wireless base stations 1 may use, as information related to the processing load, the number of wireless terminals 2 managed by the wireless base station 1 itself. "The wireless terminals 2 managed by the wireless base station 1 itself" herein may be described, in other words, as wireless terminals 2 each of which is coupled to the corresponding one of cells (that is, the cells C1 formed by the RRUs 12 under control of the wireless base station 1 itself) formed by the wireless base station 1 itself. The number of the wireless terminals 2 is directly linked to the magnitude of the processing load of the wireless base station 1, and therefore, is considered preferable as information related to the processing load.

Each of the wireless base stations 1 may use, as information related to the processing load, a monitoring result for a computer resource of the wireless base station 1 itself. Examples of the computer resource that is to be monitored include the use rate of a processor, such as a DSP, a CPU, and the like, which is mounted therein, the user rate of a memory, such as a RAM, and the like. Furthermore, each of the wireless base stations 1 may also use a wireless resource usage, a data processing amount, a power consumption, an inside temperature, and the like. In any case, each of the wireless base stations 1 acquires information related to the processing load of the wireless base station 1 itself in S101.

In S102 of FIG. 4, each of the wireless base stations 1 (the first wireless base station 1#1 to the third wireless base station 1#3) exchanges information related to the processing load of the wireless base station 1 itself acquired in S101 with the other ones of the wireless base stations 1. The exchange of information related to the processing load in S102 may be performed in an arbitrary method. For example, each of the wireless base stations 1 may spontaneously transmit information to the other ones of the wireless base stations 1 at predetermined timings, and may transmit information in response to a request from each of the other ones of the wireless base stations 1.

Through the information exchange of S102, the first wireless base station 1#1 may acquire information related to the processing load of each of the second wireless base station 1#2 and the third wireless base station 1#3.

In S103 of FIG. 4, the first wireless base station 1#1 determines whether or not sharing of baseband processing is desired. In this case, the first wireless base station 1#1 determines whether or not sharing of baseband processing is desired, based on information related to the processing load of the first wireless base station 1#1 itself acquired in S101. If the processing load of the first wireless base station 1#1 is sufficiently small, it is not highly desired that the baseband processing is shared with the one or more other wireless base stations 1. Therefore, it is considered reasonable to consider a self processing load in determining whether or not sharing of baseband processing is desired.

For example, in S103, the first wireless base station 1#1 may determine whether or not sharing of baseband processing is desired, based on the number of wireless terminals 2 managed by the first wireless base station 1#1 itself, which has been acquired in S101. Specifically, if the number of wireless terminals 2 managed by the first wireless base station 1#1 itself is a predetermined number or more, the first wireless base station 1#1 determines that the sharing of baseband processing is desired, and if the number of wireless terminals 2 managed by the first wireless base station 1#1 itself is less than the predetermined number, the first wireless base station 1#1 determines that the sharing of baseband processing is not desired.

In S103 of FIG. 4, as an example, assume that the first wireless base station 1#1 determines that sharing of baseband processing is desired.

In S104 of FIG. 4, the first wireless base station 1#1 determines next processing, based on a determination result of S103. Specifically, if it is determined in S103 that sharing of baseband processing is desired, the first wireless base station 1#1 causes the process to proceed to the processing in S105. On the other hand, if it is determined in S103 that sharing of baseband processing is not desired, the first wireless base station 1#1 causes the process to return to the processing in S101. That is, as long as it is determined in S103 that sharing of baseband processing is not desired, the determination of S101 to S103 is repeated.

As described above, if it is determined in S103 of FIG. 4 that sharing of baseband processing is desired, the first wireless base station #1 causes the process to proceed to the processing in S105. In this case, in S105, the first wireless base station 1#1 selects (determines) one of the one ore other wireless base stations 1, which is to be share destinations of baseband processing. That is, in S105, the first wireless base station 1#1 selects, when baseband processing performed by the first wireless base station 1#1 is shared with one of the one or more other wireless base stations 1, one of the one or more other wireless base stations 1. Note that, in the first embodiment, the second wireless base station 1#2 and the third wireless base station 1#3 correspond to the one or more other wireless base stations 1.

In this case, the first wireless base station 1#1 selects, based on information related to the processing loads of the one or more other wireless base stations 1 acquired in S102, a share destination of the baseband processing. If the processing loads of the one or more other wireless base stations 1 are not considered, a case might arise in which one of the one or more other wireless base stations 1 the load of which is already sufficiently high is selected as a share destination of baseband processing. In such a case, there is a probability that, after taking over a part of the baseband processing, the one of the one or more other wireless base stations 1 is in an overload state and various adverse effects arise. Therefore, it is considered reasonable to consider the processing loads of the one or more other wireless base stations 1 in selecting a share destination of baseband processing.

For example, in S105, the first wireless base station 1#1 selects, as a share destination of baseband processing, one of the one or more other wireless base stations 1 the number of wireless terminals 2 of which is a predetermined value or less, based on the number of wireless terminals 2 managed by each of the one or more other wireless base stations 1 (the second wireless base station 1#2 and the third wireless base station 1#3).

In S105 of FIG. 4, as an example, assume that the first wireless base station 1#1 selects the second wireless base station 1#2 as a share destination of baseband processing.

Next, in S106 of FIG. 4, the first wireless base station 1#1 selects (determines) a range in which baseband processing of the first wireless base station 1#1 is shared with the one (the second wireless base station 1#2) of the one or more other wireless base stations 1, which has been selected in S105. In this case, for example, the range is set in units of the cell 1C.

That is, as illustrated in FIG. 3, the first wireless base station 1#1 includes seven RRUs 12, and forms seven cells 1C. In S106, the first wireless base station 1#1 selects a cell 1C, which is one of the seven cells 1C, the baseband processing of which is shared with the second wireless base station 1#2. The number of cells 1C to be selected may be one, and may be plural. Also, in selecting a cell 1C the baseband processing of which is shared with the second wireless base station 1#2, arbitrary rule and index may be used. For example, in view of the magnitudes of respective processing loads of both of the first wireless base station 1#1, which is a share source of baseband processing, and the second wireless base station 1#2, which is a share destination of the baseband processing, the first wireless base station 1#1 may select a cell 1C the baseband processing of which is shared with the second wireless base station 1#2.

In S106 of FIG. 4, as an example, assume that the first wireless base station 1#1 selects, as the range in which the baseband processing of the first wireless base station 1#1 is shared with the second wireless base station 1#2, the third cell 1C formed by the third RRU 12, which is one of the three cells 1C managed by the first wireless base station 1#1 itself.

Next, in S107 of FIG. 4, the first wireless base station 1#1 requests the second wireless base station 1#2 to share baseband processing. This is realized by transmission of a signal that requests sharing of baseband processing to the second wireless base station 1#2, which is performed by the first wireless base station 1#1. For the sake of convenience, the signal is referred to as a sharing request signal.

The sharing request signal may include various types of information (parameters) related to sharing of baseband processing. For example, the sharing request signal may include the identifier of one of the wireless base stations 1, which is a share source (a request source), the identifier of one of the one or more other wireless base stations 1, which is a share destination (a request destination) selected in S105, and the identifier of the cell 1C, which is a share target selected in S106. Also, the sharing request signal may include information, such as a start timing of sharing of baseband processing, the number of wireless terminals 2 coupled to the cell 1C, which is a share target, and the like.

In S107 of FIG. 4, the second wireless base station 1#2 receives a sharing request signal from the first wireless base station 1#1. In response to the sharing request signal, in S108, the second wireless base station 1#2 determines whether or not requested sharing is acceptable. The second wireless base station 1#2 may perform the determination using various types of information Included in the sharing request signal and other various types of information.

In S109, the second wireless base station 1#2 transmits a response signal to the sharing request signal to the first wireless base station 1#1. For the sake of convenience, the signal IS referred to as a sharing request response signal. A content of the sharing request response signal reflects determination of S108. That is, if it is determined in S108 that sharing is acceptable, the sharing request response signal indicates that sharing is acceptable. On the other hand, if it is determined in S108 that sharing is not acceptable, the sharing request response signal indicates that sharing is not acceptable.

In FIG. 4, as an example, assume that, in S108, the second wireless base station 1#2 determines that sharing of baseband processing is acceptable and, in S109, the second wireless base station 1#2 transmits a sharing request response signal indicating that sharing is acceptable.

In S109 of FIG. 4, the first wireless base station 1#1 receives the sharing request response signal from the second wireless base station 1#2. As described above, the sharing request response signal in FIG. 4 indicates that sharing of baseband processing is acceptable. Then, in S110, in response to the sharing request response signal indicating that sharing of baseband processing is acceptable, the first wireless base station 1#1 starts sharing of baseband processing.

As described above, in the second embodiment, hierarchical layers that form a protocol stack of LTE are divided into two, the physical layer is handled as a hierarchical layer that performs "a process that has a time limitation", and the MAC layer and higher layers are handled as hierarchical layers each of which performs "a process that does not have a time limitation". Thus, in S110, based on the above-described division, sharing of baseband processing between the wireless base stations 1 is performed.

More specifically, in S110, the first wireless base station 1#1, which is a share source of baseband processing, executes a process, in the baseband processing, which is performed by the physical layer, by itself. On the other hand, the second wireless base station 1#2, which is a share destination of the baseband processing, executes (takes over) processes, in the baseband processing, which are performed by the MAC layer and higher layers, instead of the first wireless base station 1#1. In this case, passing of a baseband signal between the physical layer and the MAC layer is performed, and this is realized by transmission and reception of the baseband signal between the first wireless base station 1#1 and the second wireless base station 1#2.

In addition, in this case, in S110, a target of execution of the processes of the MAC layer and higher layers performed by the second wireless base station 1#2 is determined based on selection of a sharing request target in S106 and the sharing request signal in S107. That is, a target of execution of the processes of the MAC layer and higher layers performed by the second wireless base station 1#2 is a part related to the third cell 1C, among the three cells 1C managed by the first wireless base station 1#1, which is formed by the third RRU 12. Also, if the sharing request signal in S107 includes various types of information (parameters) related to sharing of baseband processing, the sharing in S110 is executed based on the various types of information. For example, if the sharing request signal includes information indicating a start timing of sharing of baseband processing, the sharing in S110 is performed based on the start timing.

Note that, an end of sharing may be determined and executed by an arbitrary method. For example, if the processing load of the first wireless base station 1#1 is a predetermined value or less, the first wireless base station 1#1 may request the second wireless base station 1#2 to end sharing.

Also, for example, between S109 and S110, the first wireless base station 1#1 may transmit information that is used by the second wireless base station 1#2 in performing a shared part of baseband processing to the second wireless base station 1#2 (not illustrated in FIG. 4). For example, in this embodiment, the second wireless base station 1#2 executes the processes of the MAC layer and higher layers, and therefore, the first wireless base station 1#1 is enabled to transmit various types of information (specifically, for example, the identifier of a terminal, and the like) managed by each of the MAC layer and higher layers to the second wireless base station 1#2. Thus, the second wireless base station 1#2 is enabled to smoothly perform the shared part of baseband processing.

As described above with reference to FIG. 4, according to the second embodiment, when baseband processing of one of the wireless base stations 1 is shared with one of the one or more other wireless base stations 1, one of the wireless base stations 1 may perform at least a process, in the baseband processing, which has a processing time limitation (by itself).

Note that, in FIG. 4, each of processes of S101 to S110 performed by the wireless base stations 1 is performed by the corresponding one of the BBUs 11 included in the wireless base stations 1. The configurations of the wireless base stations 1 and the BBUs 11 will be described later.

The processing flow illustrated in FIG. 4 has been described so far, and modified examples will be described below.

As described above, in S103, the first wireless base station 1#1 determines, based on information related to the processing load of the first wireless base station 1#1 itself, whether or not sharing of baseband processing is desired. However, in determining whether or not sharing of baseband processing is desired, an index other than information related to the processing load of the first wireless base station 1#1 itself may be considered. As an example, considering also the processing loads of the one or more other wireless base stations 1, whether or not sharing of baseband processing is desired may be determined.

As described above, in S105, the first wireless base station 1#1 selects, based on information related to the processing loads of the one or more other wireless base stations 1, a share destination of baseband processing. However, in selecting a share destination of baseband processing, an index other than information related to the processing loads of the one or more other wireless base stations 1 may be considered.

As such an index, for example, information related to a communication delays between the self wireless base station 1 and each of the one or more other wireless base stations 1 may be used. If one of the one or more other wireless base stations 1, which causes a great communication delay, is selected as a share destination, a baseband signal passing time is prolonged based on the communication delay. If, although a process, in baseband processing, which has a relatively small time limitation, is shared with the one of the one or more other wireless base stations 1, the baseband signal passing time is longer than expected, the time limitation is not satisfied, thus resulting in a problem. Therefore, a share destination of baseband processing is selected, based on information related to communication delay between the self wireless base station 1 and each of the one or more other wireless base stations 1.

For example, the first wireless base station 1#1 measures a round trip time (RRT) between the first wireless base station 1#1 and each of the one or more other wireless base stations 1 (the second wireless base station 1#2 and the third wireless base station 1#3), and thus, information related to a communication delay therebetween may be acquired. A distance between the wireless base stations 1 measured by an arbitrary method may be used as information related to a communication delay.

The index used in selecting a share destination in S105 is not limited to the above-described indexes, and an arbitrary index may be used. Needless to say, a single index may be used, and a plurality of indexes may be used in combination. Also, a share destination may be fixed (targeted) in each of the wireless base stations 1, that is, for example, the first wireless base station 1#1 may select the second wireless base station 1#2 each time.

According to the above-described second embodiment, even when baseband processing of one of the wireless base stations 1 is shared with one of the one or more other wireless base stations 1, the one of the wireless base stations 1 performs at least a process, in the baseband processing, which has a processing time limitation (by itself). Thus, the process, in the baseband processing, which has a processing time limitation, is not influenced by a delay caused by passing of a baseband signal. Therefore, according to the second embodiment, similar to the first embodiment, the problem of a time limitation for baseband processing based on the specification of a wireless communication protocol may be solved.

Third Embodiment

A third embodiment will be described with reference to FIG. 5 and FIG. 6. In the above-described second embodiment, the wireless base station 1 itself determines whether or not sharing of baseband processing is desired. In contrast, in the third embodiment, a control device 3, which is different from the wireless base station 1, determines whether or not sharing of baseband processing is desired.

The third embodiment shares many common points with the second embodiment. Therefore, the third embodiment will be described below with focus on different points from the second embodiment.

First, a system configuration of a wireless communication system according to the third embodiment will be described with reference to FIG. 5.

Figure 5:
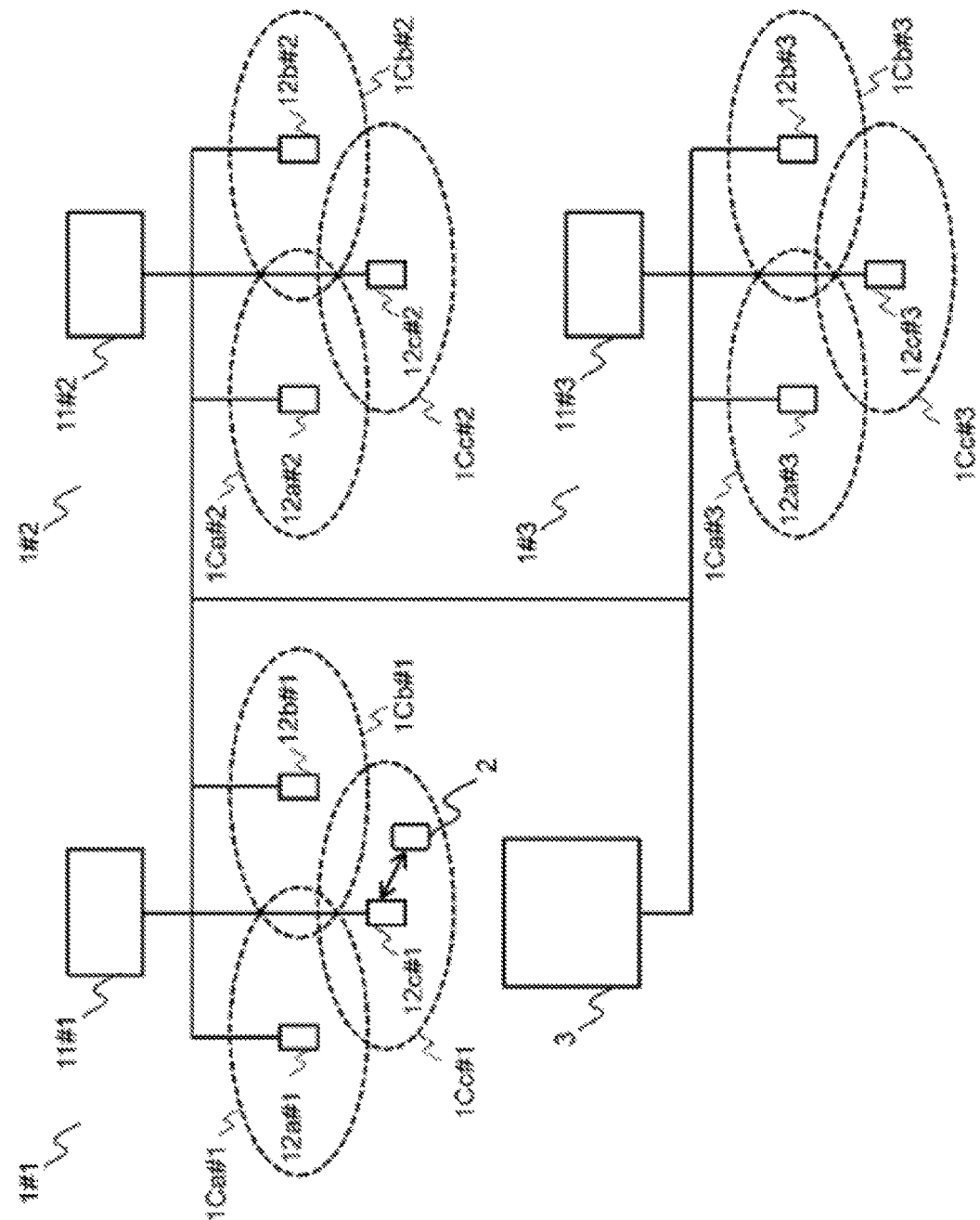
FIG. 5 is a diagram illustrating a system configuration according to a third embodiment.

In comparison with the system configuration according to the second embodiment illustrated in FIG. 3, the control device 3 is added in a system configuration according to the third embodiment illustrated in FIG. 5. The control device 3 may be, for example, the same device as an evolved packet core (EPC) device, a mobility management entity (MME) device, or the like, in an LTE system, and may be a different device from these devices. The control device 3 is coupled to each of the wireless base stations 1 by an optical fiber, or the like, via an optical switch (not illustrated), and may perform a low-delay communication.

Next, a sequence diagram illustrating a processing flow in a wireless communication system according to the third embodiment will be described with reference to FIG. 6.

Figure 6:
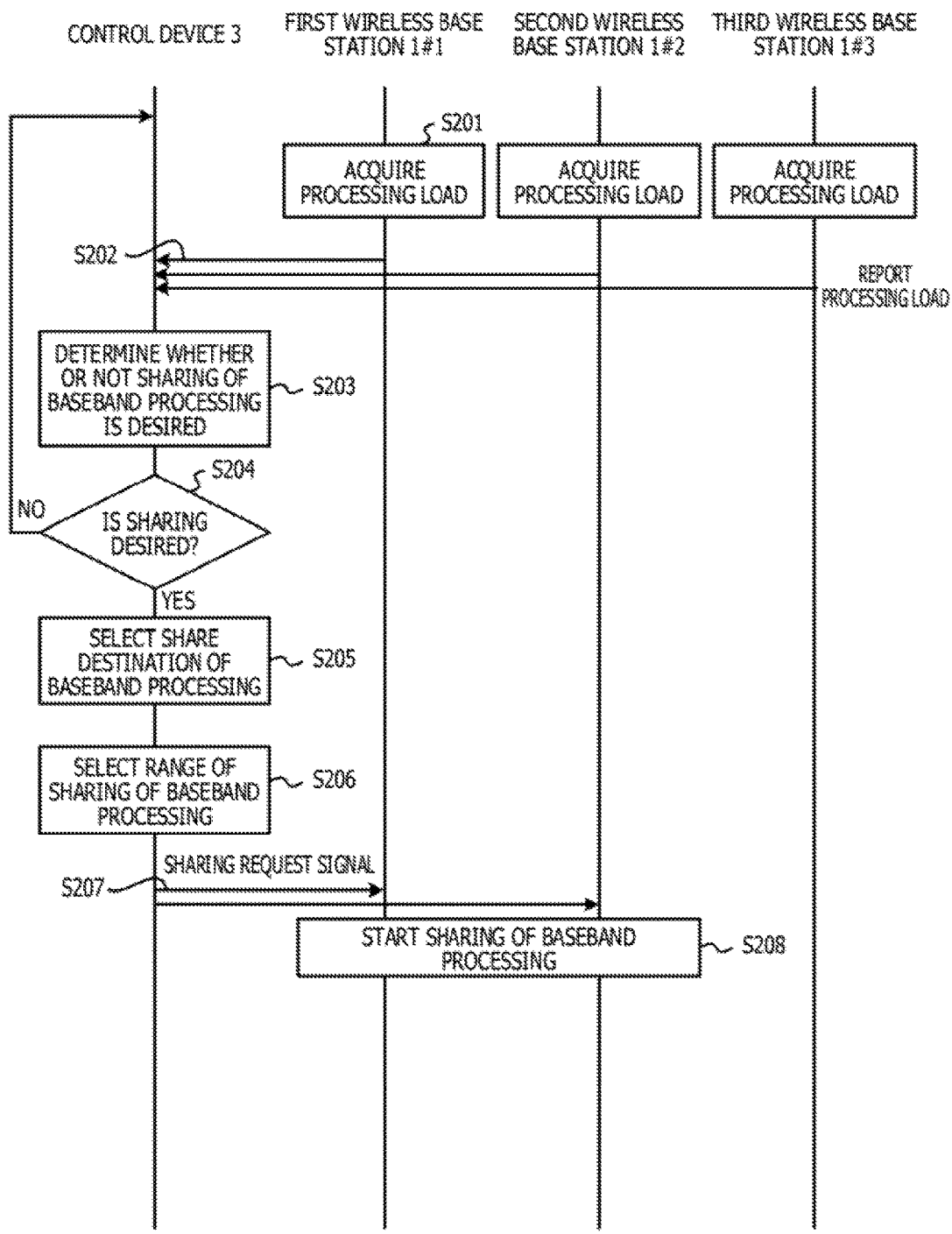
FIG. 6 is a sequence diagram illustrating a flow of processing according to the third embodiment.

First, in S201 of FIG. 6, similar to S101 of FIG. 4, each of the wireless base stations 1 acquires information (an index) related to the processing load of the wireless base station 1 itself.

Next, in S202 of FIG. 6, each of the wireless base stations 1 (the first wireless base station 1#1 to the third wireless base station 1#3) transmits the information related to the processing load of the wireless base station 1 itself acquired in S201 to the control device 3. Thus, the control device 3 acquires information related to the processing load of each of the wireless base stations 1.

In S203 of FIG. 6, the control device 3 determines whether or not sharing of baseband processing is desired in each of the wireless base stations 1 in a similar manner to that performed by the first wireless base station 1#1 in S103 of FIG. 4. In S203, as an example, assume that the control device 3 determines whether or not sharing of baseband processing is desired in the first wireless base station 1#1.

S204 of FIG. 6 is similar to S104 of FIG. 4.

Next, in S205 of FIG. 6, the control device 3 selects (determines) one of the one or more other wireless base stations 1, which is to be a share destination of baseband processing, in a similar manner to that performed by the first wireless base station 1#1 in S105 of FIG. 4. In S205, as an example, assume that the control device 3 selects the second wireless base station 1#2 as a share destination of baseband processing in the first wireless base station 1#1.

In S206 of FIG. 6, the control device 3 selects (determines) a range in which baseband processing is shared with one (the second wireless base station 1#2) of the one or more wireless base stations 1 in a similar manner to that performed by the first wireless base station 1#1 In S106 of FIG. 4. In S206, as an example, assume that the control device 3 selects, as the range in which baseband processing is shared with the second wireless base station 1#2, the third cell 1C formed by the third RRU 12, among the three cells 1C managed by the first wireless base station 1#1.

In S207 of FIG. 6, based on S203 to S206, the control device 3 requests (Instructs) the first wireless base station 1#1, which is a share source of baseband processing, and the second wireless base station 1#2, which is a share destination of the baseband processing, to share the baseband processing.

In S208 of FIG. 6, the first wireless base station 1#1 and the second wireless base station 1#2 start sharing of the baseband processing in a similar manner to that performed in S110 of FIG. 4.

The processing flow illustrated in FIG. 6 has been described so far. Note that, in S206 of FIG. 6, the control device 3 unilaterally instructs each of the wireless base stations 1 to share baseband processing. However, the wireless base stations 1 that are a share source and a share destination of baseband processing may refuse sharing requested (Instructed) by the control device 3.

According to the third embodiment, which has been described above, even when baseband processing of one of the wireless base stations 1 is shared with the one or more wireless base stations 1, the one of the wireless base stations 1 performs at least a process, in the baseband processing, which has a processing time limitation (by itself). Thus, the process, in the baseband processing, which has a time limitation, is not influenced by a delay caused by passing of a baseband signal. Therefore, according to the third embodiment, similar to each of the above-described embodiments, the problem of a time limitation for baseband processing based on the specification of a wireless communication protocol may be solved.

Modified Examples and the Like

Modified examples of the above-described embodiments will be described below. Each of the following modified examples may be combined with each of the above-described embodiments independently or in combination with another one of the modified examples.

First, in the above-described second embodiment and the like, in division of baseband processing, a process of a physical layer in a protocol stack of an LTE system is handled as "a process that has a time limitation", and processes of the MAC layer and higher layers therein are handled as "processes that do not have a time limitation". However, the above-described division is merely an example, and baseband processing may be divided at a different boundary. As an example, the processes of the MAC layer and lower layers may be handled as "processes that have a time limitation", and processes of the RLC layer and higher layers may be handled as "processes that do not have a time limitation".

Division of baseband processing into "a process that has a time limitation" and "a process that does not have a time limitation" may be performed in view different from protocol stack hierarchical layers. For example, a process for which a time limitation defined in the (standard) specification is a predetermined time or more may be handled as "a process that has a time limitation", and a process that is not the above-described process may be handled as "a process that does not have a time limitation".

Furthermore, in each of the above-described embodiments, baseband processing is divided into two types, that is, "a process that has a time limitation" and "a process that does not have a time limitation", and the baseband processing is shared with two wireless base stations 1 (the BBUs 11), based on the division. However, baseband processing may be divided into three or more types, and the baseband processing may be shared with three or more wireless base stations 1 (the BBUs 11), based on the division. For example, baseband processing may be divided into three, that is, "a process that has a relatively large time limitation", "a process that has an intermediate level time limitation", and "a process that has a relatively small time limitation", and three wireless base stations 1 (the BBUs 11) may share the baseband processing, based on the division.

In the above-described second embodiment and the like, a range of sharing of baseband processing is selected in units of the cell 1C. However, this is merely an example, and the range of sharing of baseband processing may be selected in some other unit. For example, the range of sharing of baseband processing may be selected in units of a sector, which forms the cell 1C.

Functional Configuration of Each Device in Wireless Communication System According to Each Embodiment Next, functional configurations of the wireless base station 1 and the control device 3 in a wireless communication system according to each of the above-described embodiments will be described with reference to FIG. 7 and FIG. 8.

Figure 7:
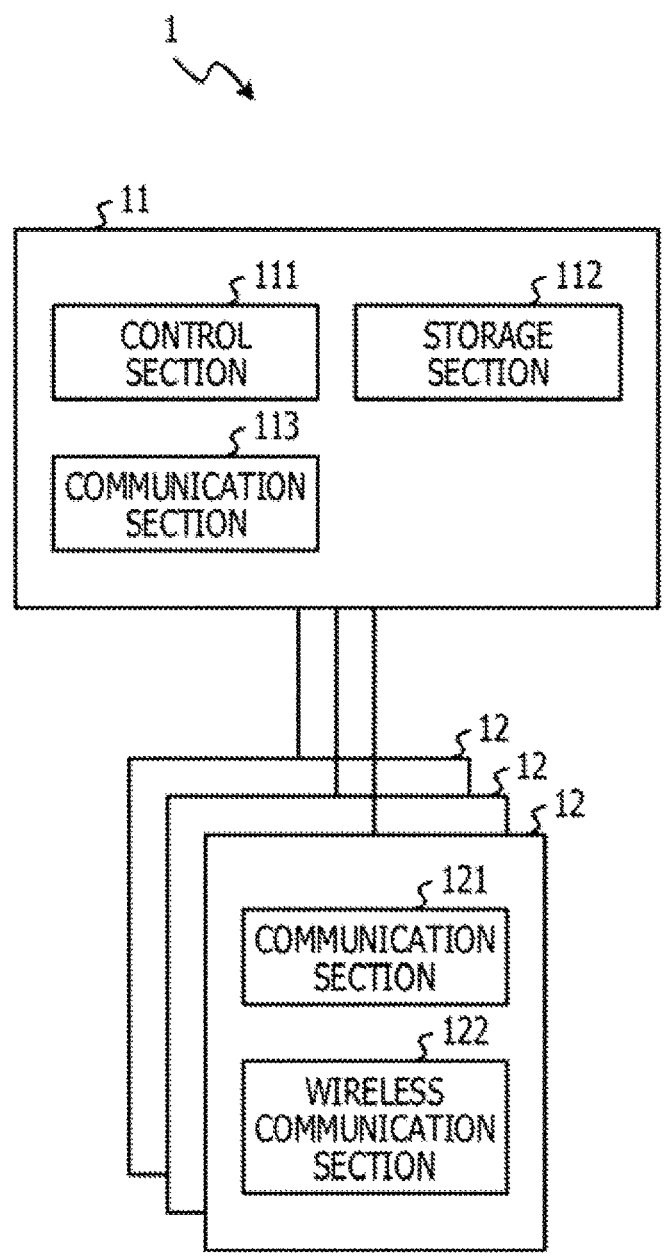
FIG. 7 is a diagram illustrating an example of a functional configuration of a wireless base station in each embodiment.

FIG. 7 is a block diagram illustrating an example of a functional configuration of the wireless base station 1 (the first wireless base station 1#1 to the third wireless base station 1#3 In each embodiment). As illustrated in FIG. 7, for example, the wireless base station 1 is divided into one BBU 11 and one or more RRUs 12. The BBU 11 includes a control section 111, a storage section 112, and a communication section 113. Also, each of the RRUs 12 includes a communication section 121 and a wireless communication section 122.

The control section 111 of the BBU 11 performs control of various types of processing related to wireless communication performed by the wireless base station 1 with a wireless terminal 2. Processing controlled by the control section 111 includes every processing executed by each of the wireless base stations 1, whether or not there is clear description thereof in each of the above-described embodiments and modified examples.

The storage section 112 of the BBU 11 stores various types of information related to wireless communication performed by the wireless base station 1 with the wireless terminal 2. Information stored in the storage section 112 includes every information handled by each of the wireless base stations 1, whether or not there is clear description thereof in each of the above-described embodiments and modified examples.

The communication section 113 of the BBU 11 transmits and receives various signals related to wireless communication performed by the wireless base station 1 with the wireless terminal 2 to and from each device. Devices to and from which the communication section 113 transmits and receives signals include the RRUs 12 under control performed by the communication section 113 itself, the one or more other wireless base stations 1 (the BBUs 11 or the RRUs 12), the control device 3, and the like. Signals transmitted and received by the communication section 113 include every signal transmitted and received by each of the wireless base stations 1 or the BBU 1 to and from the RRUs 12 under control performed by the communication section 113 itself, the one or more other wireless base stations 1 (the BBUs 11 or the RRUs 12), the control device 3, and the like, whether or not there is clear description thereof in each of the above-described embodiments and modified examples.

The communication section 121 of each of the RRUs 12 transmits and receives various signals related to wireless communication performed by the wireless base station 1 with the wireless terminal 2 to and from each device. Devices to and from which the communication section 121 transmits and receives signals include the BBU 11 that manages the communication section 121, the one or more other wireless base stations 1 (the BBUs 11), and the like. Signals transmitted and received by the communication section 121 include every signal transmitted and received by each of the wireless base stations 1 or the RRUs 12 to and from the BBU 11 that manages the communication section 121, the one or more other wireless base stations 1 (the BBUs 11), and the like, whether or not there is clear description thereof in each of the above-described embodiments and modified examples.

The wireless communication section 122 of each of the RRUs 12 transmits and receives various wireless signals related to wireless communication performed by the wireless base station 1 with the wireless terminal 2 to and from the wireless terminal 2 and the like. Wireless signals transmitted and received by the wireless communication section 122 include every wireless signal transmitted and received by each of the wireless base stations 1 or the RRUs 12 to and from the wireless terminal 2 and the like, whether or not there is clear description thereof in each of the above-described embodiments and modified examples.

Figure 8:
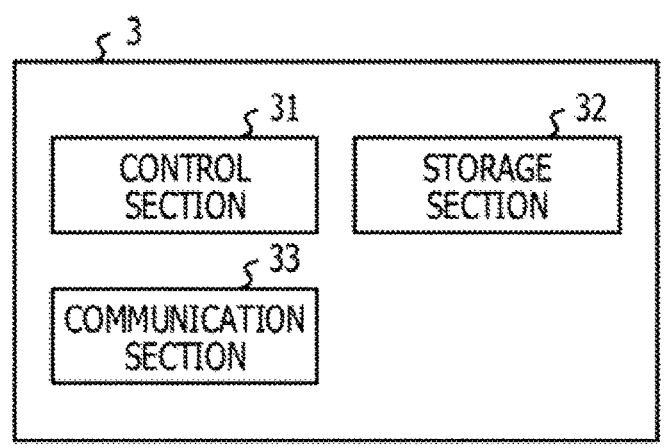
FIG. 8 is a diagram illustrating an example of a functional configuration of a control device in the third embodiment.

FIG. 8 is a block diagram illustrating an example of a functional configuration of the control device 3 in the third embodiment. As illustrated in FIG. 8, the control device 3 includes a control section 31, a storage section 32, and a communication section 33.

The control section 31 of the control device 3 performs control of various types of processing related to wireless communication performed by the wireless base station 1 with the wireless terminal 2. Processing controlled by the control section 31 includes every processing executed by the control device 3, whether or not there is clear description thereof in each of the above-described embodiments and modified examples.

The storage section 32 of the control device 3 stores various types of information related to wireless communication performed by the wireless base station 1 with the wireless terminal 2. Information stored in the storage section 32 includes every information handled by the control device 3, whether or not there is clear description thereof in each of the above-described embodiments and modified examples.

The communication section 33 of the control device 3 transmits and receives various signals related to wireless communication performed by the wireless base station 1 with the wireless terminal 2 to and from each device. Devices to and from which the communication section 33 transmits and receives signals include each of the wireless base stations 1 (the BBUs 11), and the like. Signals transmitted and received by the communication section 33 include every signal transmitted and received by the control device 3 to and from each of the wireless base stations 1 (the BBUs 11), and the like, whether or not there is clear description thereof in each of the above-described embodiments and modified examples.

Hardware Configuration of Each Device in Wireless Communication System According to Each Embodiment Hardware configurations of the wireless base station 1 and the control device 3 in a wireless communication system according to each embodiment and each modified example will be described with reference to FIG. 9 and FIG. 10.

Figure 9:
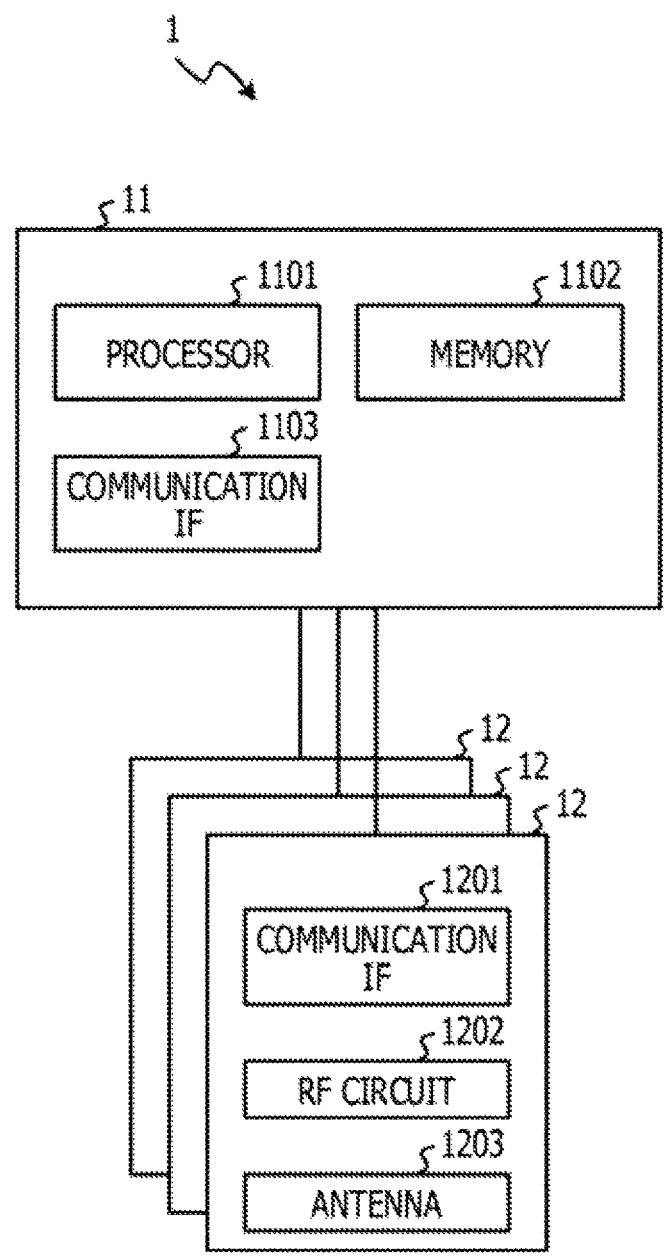
FIG. 9 is a diagram illustrating a hardware configuration of a wireless base station in each embodiment.

FIG. 9 is a diagram illustrating a hardware configuration of the wireless base station 1 (the first wireless base station 1#1 to the third wireless base station 1#3 in each embodiment). As illustrated in FIG. 9, for example, the wireless base station 1 is divided into one BBU 11 and one or more RRUs 12. The BBU 11 includes a processor 1101, a memory 1102, and a communication interface (IF) 1103. Also, each of the RRUs 12 includes a communication IF 1201, an RF circuit 1202, and an antenna 1203.

The processor 1101 is, for example, a central processing unit (CPU) or a digital signal processor (DSP). The processor 1101 may be realized by a digital electronic circuit herein. Examples of the digital electronic circuit include a field-programmable gate array (FPGA), an application specific integrated circuit (ASIC), a large scale integration (LSI), and the like.

The memory 1102 includes, for example, at least one of a random access memory (RAM), such as a synchronous dynamic random access memory (SDRAM) and the like, a read only memory (ROM), and a flash memory, and stores a program, control information, and data. In addition to the above-described components, the wireless base station 1 may include an auxiliary storage device (a hard disk, or the like), which is not illustrated, and the like. Each of the communication IF 1103 and the communication IF 1201 is, for example, a communication interface realized by an optical fiber.

Correspondence between the functional configuration of the wireless base station 1 illustrated in FIG. 7 and the hardware configuration of the wireless base station 1 illustrated in FIG. 9 will be described. The control section 111 is realized by, for example, the processor 1101, the memory 1102, and a digital electronic circuit (not illustrated), and the like. The storage section 112 is realized by, for example, the memory 1102. The communication section 113 is realized by, for example, the communication IF 1103. The communication section 121 is realized by, for example, the communication IF 1201. The wireless communication section 122 is realized by, for example, the RF circuit 1202 and the antenna 1203.

Figure 10:
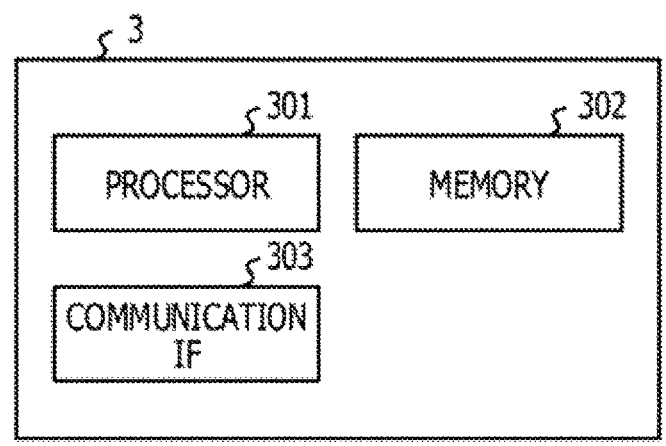
FIG. 10 is a diagram illustrating an example of a hardware configuration of the control device in the third embodiment.

FIG. 10 is a diagram illustrating an example of a hardware configuration of the control device 3. As illustrated in FIG. 10, the control device 3 includes a processor 301, a memory 302, and a communication interface (IF) 303.

The processor 301 is, for example, a central processing unit (CPU) or a digital signal processor (DSP). The processor 301 may be realized by a digital electronic circuit herein. Examples of the digital electronic circuit include a field-programmable gate array (FPGA), an application specific integrated circuit (ASIC), a large scale integration (LSI), and the like.

The memory 302 includes, for example, at least one of a random access memory (RAM), such as a synchronous dynamic random access memory (SDRAM) and the like, a read only memory (ROM), and a flash memory, and stores a program, control information, and data. In addition to the above-described components, the wireless base station 1 may include an auxiliary storage device (a hard disk, or the like), which is not illustrated, and the like. The communication IF 303 is, for example, a communication interface realized by an optical fiber.

Correspondence between the functional configuration of the control device 3 illustrated in FIG. 8 and the hardware configuration of the control device 3 illustrated in FIG. 10 will be described. The control section 31 is realized by, for example, the processor 301, the memory 302, and a digital electronic circuit (not illustrated), and the like. The storage section 32 is realized by, for example, the memory 302. The communication section 33 is realized by, for example, the communication IF 303.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
 a wireless terminal; and
 a wireless base station configured to:
 perform a wireless communication with the wireless terminal,
 perform a portion of baseband processing procedure for the wireless communication,
 wherein the baseband processing procedure being shared between the wireless base station and a second wireless base station,
 wherein the portion of the baseband processing procedure performed by the wireless base station comprises a processing procedure that has a limitation on a processing time, wherein the limitation requires the processing by the wireless base station to be completed within a specific period of time; and
 wherein the second wireless base station being configured to perform a remaining portion of the baseband processing procedure other than the portion of the baseband processing procedure performed by the wireless base station.

2. The wireless communication system according to claim 1, wherein the portion of the baseband processing procedure performed by the wireless base station is a processing performed in at least one protocol layer lower than a given protocol layer of a wireless communication protocol used for the wireless communication.

3. The wireless communication system according to claim 1, wherein
the portion of the baseband processing procedure performed by the wireless base station is a processing performed in a physical layer of a wireless communication protocol used for the wireless communication.

4. The wireless communication system according to claim 1, wherein
the second wireless base station is configured to perform the remaining portion of the baseband processing procedure the remaining portion of the baseband processing procedure being a processing that does not have the limitation on the processing time.

5. The wireless communication system according to claim 1, wherein
the wireless base station is configured to determine when to share the baseband processing procedure between the wireless base station and the second wireless base station.

6. The wireless communication system according to claim 1, further comprising:
a control device configured to determine when to share the baseband processing procedure between the wireless base station and the different wireless base station.

7. The wireless communication system according to claim 1, wherein
the wireless base station includes a baseband unit and a plurality of radio frequency units coupled to the baseband unit, each of the plurality of radio frequency units forming each of a plurality of cells.

8. The wireless communication system according to claim 7, wherein
the sharing of the baseband processing procedure is performed in units of the plurality of cells.

9. The wireless communication system according to claim 1, wherein
the second wireless base station is selected from among a plurality of other wireless base stations based on each load of each of the plurality of other wireless base stations.

10. The wireless communication system according to claim 1, wherein
the second wireless base station is selected from among a plurality of other wireless base stations based on each communication delay between the wireless base station and each of the plurality of other wireless base stations.

11. A wireless base station comprising:
a memory; and
a processor coupled to the memory and configured to:
perform a wireless communication with a wireless terminal,
perform a portion of baseband processing procedure for the wireless communication,
wherein the baseband processing procedure being shared between the wireless base station and a second wireless base station,
wherein the portion of the baseband processing procedure performed by the wireless base station comprises a processing procedure that has a limitation on a processing time wherein the limitation requires the processing by the wireless base station to be completed within a specific period of time; and
wherein the second wireless base station being configured to perform a remaining portion of the baseband processing procedure other than the portion of the baseband processing procedure performed by the wireless base station.

12. A wireless base station comprising:
a memory; and
a processor coupled to the memory and configured to:
receive a request signal requesting to share a baseband processing procedure between the wireless base station and a second wireless base station, the baseband processing procedure being for a wireless communication between the second wireless base station and a wireless terminal, and
perform a portion of the baseband processing procedure for the wireless communication,
wherein the portion of the baseband processing procedure perform by the wireless base station comprises a processing procedure that does not have a limitation on a processing time, and
wherein the second wireless base station being configured to perform a remaining portion of the baseband processing procedure other than the portion of the baseband processing procedure performed by the wireless base station.

* * * * *